(12) United States Patent
Kliland

(10) Patent No.: US 6,771,741 B2
(45) Date of Patent: Aug. 3, 2004

(54) SURVEILLANCE ARRANGEMENT AND CONTROLLER

(75) Inventor: Kevin Kliland, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 123 days.

(21) Appl. No.: 09/985,632

(22) Filed: Nov. 5, 2001

(65) Prior Publication Data

US 2002/0054666 A1 May 9, 2002

(30) Foreign Application Priority Data

Nov. 6, 2000 (NO) .......................................... 20005582

(51) Int. Cl.[7] .......................... H04M 11/04; H04N 7/14
(52) U.S. Cl. ..................... 379/39; 348/14.13; 348/143
(58) Field of Search .................. 379/37–51; 348/14.01, 348/14.02, 14.12, 14.13, 143; 340/541, 539; 370/231, 228, 352

(56) References Cited

U.S. PATENT DOCUMENTS

| | | | |
|---|---|---|---|
| 5,717,379 A | | 2/1998 | Peters |
| 5,810,747 A | | 9/1998 | Brudny et al. |
| 5,987,519 A | | 11/1999 | Peifer et al. |
| 6,101,182 A | | 8/2000 | Sistanizadeh et al. |
| 6,226,031 B1 | * | 5/2001 | Barraclough et al. .... 348/14.13 |
| 6,271,752 B1 | * | 8/2001 | Vaios ......................... 340/541 |
| 6,400,707 B1 | * | 6/2002 | Baum et al. ................. 370/352 |
| 6,466,258 B1 | * | 10/2002 | Mogenis et al. ............ 348/143 |
| 6,496,477 B1 | * | 12/2002 | Perkins et al. .............. 370/228 |
| 6,529,475 B1 | * | 3/2003 | Wan et al. ................... 370/231 |

FOREIGN PATENT DOCUMENTS

WO          00/36807 A2     6/2000

OTHER PUBLICATIONS

De Jesus et al, "Multisensorial Modular System of Monitoring and Tracking with Information Fusion Techniques and Neural Networks", 1999, Piscataway, NJ, USA, IEEE, pp. 59–66.

* cited by examiner

Primary Examiner—Wing Chan
(74) Attorney, Agent, or Firm—Nixon & Vanderhye, P.C.

(57) ABSTRACT

A multimedia surveillance arrangement comprising a surveillance sensor adapted to communicate by a standard communication protocol media representing at least one sensed parameter according, a plurality of networks interconnected by media gateways and at least one network controller, and a surveillance receiver adapted to receive all or part of said media. The network controller also serves as endpoint for media from the surveillance sensor, is adapted to interact with said received media, is responsive to information contained in the received media, and is adapted to communicate an event message and/or all or part of said received media on basis of said information. The multimedia network controller ca be a SIP server or H.323 Gatekeeper, adapted to interact with said surveillance media, for generating an event message.

10 Claims, 1 Drawing Sheet

SURVEILLANCE ARRANGEMENT AND CONTROLLER

FIELD OF THE INVENTION

The invention relates to the field of remote surveillance, supervision and alarming, and particularly to a surveillance arrangement employing multimedia networks and a multimedia network controller having surveillance functionality provisions.

BACKGROUND

In the field of surveillance, supervision or alarming, the term irregularity is usually referred to as a sound or movement that deviates from what is considered common in the facility area that is being monitored.

In solutions for surveillance, supervision or alarming, the control logic is typically referred to as the hardware or software system part that detects and responds to an irregularity, such as for instance making a call, or sending an e-mail etc., to notify an operator when an irregularity is detected by the system.

Surveillance solutions capable of notifying a facility caretaker of unusual or irregular conditions or events at the facility are often expensive, are typically based on provider specific or custom made equipment and software. Furthermore, such solutions often employ expensive dedicated or leased lines, typically in order to obtain the required notification priority.

A solution in the field of the invention is known from WO 98/24078, describing a system with alarm sensors with a 4-level capability. A central alarm unit polls the alarm sensors, which are connected by ISDN-lines. D-channels are used for the purpose, such that normal telephony can operate in parallel.

Other such solutions are known from U.S. Pat. No. 5,745,849, WO 98/16412, WO 98/34126, and U.S. Pat. No. 5,754,111.

Typically for known solutions are that they do not fully address a number of problems raised in this area. Some such problems that still require further attention are:

- Customer's, operator's and manufacturer's desire to use more standardised equipment and systems, preferably based on public or industry standards, or other available standards, that also can simplify such solutions as well as lower their investment and/or operating costs,
- cost aspects related to the use of expensive circuits which lines, such as for instance PSTN, that typically are being used as communication bearers between the sensor and the server, or central unit, and for delivering notifications such as warnings and alarms,
- low or inefficient usage of the often expensive control logic due to that those parts of solutions in this area typically are located, and associated with, the "client", that is, proximal to the sensor side of a system, and,
- the difficulties often encountered in obtaining access to the control logic for maintenance and operations activities, such as e.g. making control logic updates and/or modifications.

It is an object of the invention to provide an improved solution for surveillance, supervision and alarming.

SUMMARY

A multimedia surveillance arrangement comprises a multimedia surveillance sensor arrangement, surveillance receiver: and a network arrangement. The multimedia surveillance sensor arrangement which comprise an H.321 or SIP gained first end-point and which is adapted for establishing a multimedia connection for communicating surveillance media according to a multimedia communication protocol standard corresponding to the H.323 standard recommendation or the SIP standard recommendation. The multimedia surveillance sensor arrangement is connected to a first multimedia H.323 or SIP adapted network. The surveillance media represents at least one sensed parameter. The surveillance receiver comprises an H.323 or SIP adapted second end-point and adapted to receiving all or part of the surveillance media and connected to a second multimedia adapted network. The network arrangement comprises the first and second multimedia adapted networks and interconnected by media gateways and at least one network controller. The network controller is a SIP server or an H.323 Gatekeeper and is adapted to serve as an endpoint for receiving the surveillance media communicated from the surveillance sensor. The network controller is further adapted to interact with the received surveillance media, the is responsive to information contained in the received surveillance media and is adapted to communicate an event message or at least part of the received surveillance media to the multimedia surveillance receiver on basis of the information. Another aspect concerns the multimedia network controller itself.

BRIEF DESCRIPTION OF THE DRAWINGS

In the following, the present invention will be explained by way of example and with reference to the accompanying drawings, where.

DETAILED DESCRIPTION OF EMBODIMENTS

Figure 1:
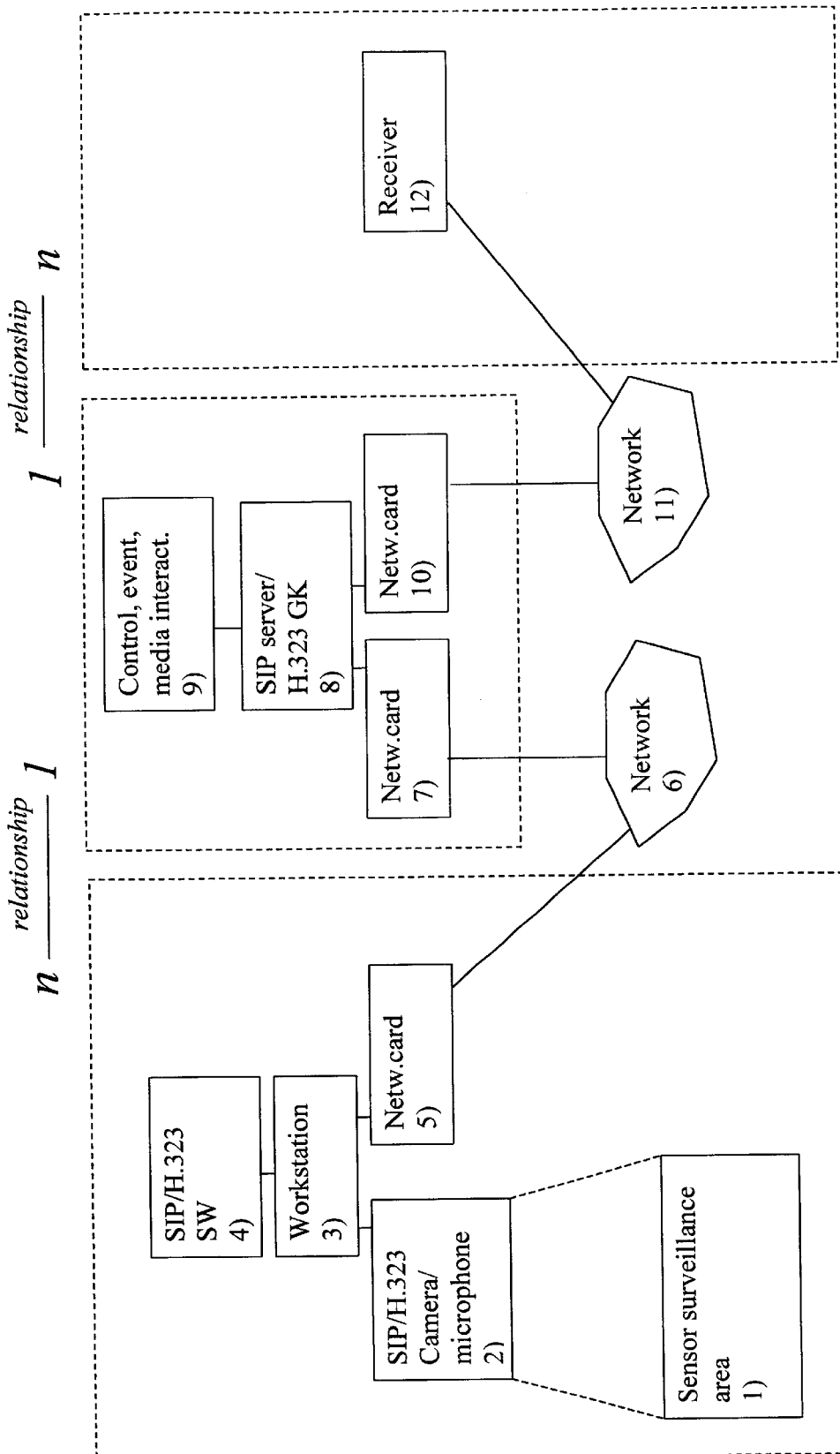
FIG. 1 illustrates schematically an exemplary embodiment of a surveillance solution according to the present invention.

Referring now to FIG. 1, the various elements of the exemplary embodiment shown in FIG. 1 will be explained according to the reference numerals used in the example to identify the various elements, wherein:

(1) denotes the sensor surveillance area;

(2) denotes a H.323 or SIP enabled video or microphone sensor;

(3) denotes a workstation, such as Personal Computer (PC) or similar arrangement;

(4) denotes H.323 or SIP function of the work station, typically obtained by suitable software running on the work station.

Also, with reference to FIG. 1, it should be noted that the endpoint can also comprise HW. Furthermore:

(5) denotes a network card: typically an Ethernet card if communicating by a computer network, or if using a telephone line, implying use of a modem or an ISDN card;

(6) denotes typically an Internet Protocol (IP) based packet network (though, the leg from the endpoint towards e.g. an Internet Service Provider (ISP) could be based on PSTN or ISDN);

(7) denotes a network card, typically an Ethernet card, or other network interfacing element (such as the element of reference numeral (5));

(8) denotes an H.323 Gatekeeper (GK) or a SIP server of a multimedia network;

(9) denotes the control logic that: communicates over a media application programming interface (API)

towards the GK/SIP server, interacts with media received from sensor assembly, detects irregularities from received media, generates events, initiates/performs event actions (e.g. notifications), maintains records, forwards/plays media, is (optionally) dynamically configurable;

(10) denotes a network card allowing an event response generated by (9) to be communicated from (8);

(11) denotes a network suitable for making a delivery of an event response generated by (9); and

(12) denotes receiver that is enabled to receive an event response.

It should be noted that, although the exemplary solution illustrated by FIG. 1 only show a single surveillance transmitter (client) and a single receiver, several transmitters (clients) comprising elements (2)–(5) and receivers (12) can be connected to the same server. This is illustrated by the many-to-one (n–1) and one-to-many (1–n) relationships, respectively. Furthermore, within a sensor transmitter assembly, plurality constellations also apply to the legs between elements (4) and (5) and the legs between elements (8) and (10), respectively.

Typically, in the exemplary embodiment of FIG. 1, being arranged according to the H.323 standard, the operating software and the hardware of an assembly of sensor (2), surveillance work station (3) and transmitter controller (4) are off-the shelf items that provide an ordinary packet based endpoint. Hence, the endpoint of the exemplary embodiment is an H.323 or a SIP endpoint comprising, video SW, HW and, of course, suitable transmitting. In contrast to what is the case in other H.323 or SIP solutions employing an ordinary H.323 Gatekeeper or a SIP server, in the solution according to the invention, the media follows the same path as the signalling does, i.e. through the GK or SIP server. This means that, according to the invention, the GK or SIP server of the invention is adapted and/or provided with means to interact with and/or process the media being transmitted from the sensor transmitter. In order to accomplish this, it is suggested that the GK or SIP server of the present invention is adapted to provide a media API with the following methods:

Interact With Media (ChannelId)

CloseInteraction With Media (ChannelId)

The channelId identifies the media channels, e.g. by remote pair of port and IP address. The control part of (9), preferably provided by software running with the Gatekeeper, maintains knowledge of which codecs are utilised by the different channels. The control part of (9) will utilise this interface.

The control part of (9) necessarily has to interact with different codecs according to which codec the transmitter endpoints and receiver endpoints utilise.

In another aspect, the function provided by an algorithm of a simple version of software providing the control part of (9), can be to trigger an irregularity event if, for example, the average contrast of a video frame received from the sensor differs from the previous one by more than 10%. Note that different channels can be processed by use of different algorithms ("irregularity algorithms"), that is, the algorithms may be made to operate differently according to different needs.

In yet another aspect of the control part of (9), it is further contemplated that an operator, who even could be an end user at a receiver (12), can be allowed to modify those algorithms by means of a suitable protocol and/or interface. The type of algorithm applied also might be a parameter sent into the interface outlined above. A suitable protocol and/or interface for management use can HTTP/WAP with a corresponding browser based GUI.

In a solution according to the present invention, the media typically also can be stored on local devices for later being pushed out to the users or clients of the surveillance system. This may be accomplished in various ways, such as for instance to create an H.323 or SIP call to the receiver (12) when the control part of (9) detects an irregularity. Another way to push out the media, is sending the media for the period of irregularity, i.e. the period when the control part of (9) detected irregularity, by e-mail. This would imply some postprocessing activities.

Authentication, security and charging mechanisms can be applied between an operator or end user, and the GK/SIP system for any kind of interaction. Those provisions are standardised services that can be provided by H.323 or SIP enabled networks, and operators of H.323 or SIP based networks typically offer such services.

A response to an irregularity detected from the media transmitted by a sensor client can be, for example, to execute a predefined set of actions, such as to interact with two APIs, namely, the video API and an API, capable of initiating phone calls, e.g. Parlay or TAPI and a corresponding createCall method, or, to initiate a phone call with a pre-recorded message to an alarm operator or a person in charge of the environment that is being under surveillance.

Also, with reference to FIG. 1, interaction with GK/SIP provided services will be explained. It should be noted that any kind of GK/SIP appropriately activated service logic could be combined with this arrangement. Basically, the service logic can comprise services that can be made to be running "on top of" a GK/SIP server. Typically, such services are services running "on top of" a call control API, like for example multiterminal and Private Numbering Plan (PNP). A multiterminal service offers capabilitities for a user to be situated at different terminals, but be reachable at these in a certain defined way, e.g. by configuration. For example, when a multiterminal service is applied, it may be configured to, on the detection of a irregularity, first call a facility caretaker in order at home, at work and then, if not reachable otherwise, on her or his mobile telephone. When called, the caretaker may take accordingly proper actions, such as e.g. calling the police. If the caretaker is located nearby a PC terminal, she or he may be able to see a record of what triggered the alarm, and then accordingly take proper action. A record can be data on when the irregularity was detected and or video clips for the corresponding period of time. However, a prerequisite for being able to realise the last mentioned scenario, is that the PC in use for this purpose in some way is connected to the GK/SIP server, and that the media is being recorded on detection of an irregularity. Such GK/SIP services could be operator or end user configured, and security mechanisms as briefly mentioned above should be applied. Typically, in the exemplary embodiment, an operator provides such services. In other embodiments, or in an alternative embodiment, such services can be provided by 3'rd party providers.

Also, with reference to FIG. 1, network (6) for transmission of surveillance media information and/or event related media from the sensor transmitter assembly will be explained. Preferably, the network should be a network being capable of transporting TCP and UDP over IP, such as e.g. Ethernet, PSTN/ISDN, GSM and/or UMTS. If the network (6) is circuit switched, the sensor equipment is advantageously capable of initiating a connection when a reportable event occurs in the sensor surveillance area. This can be accomplished by including, at some point between the SIP or H.323 sensor and the circuit switched network, a suitable logic. As an example, such functionality could be added to the SIP or H.323 equipment.

Also, with reference to FIG. 1, emitting an event notification by means of an ordinary public switched telephone network (PSTN) based network (11) will be explained. In this example, the control part of (9) can be located on a PC, with an Internet connection on the receiving side (7), and a PSTN connection on the emitting side (10). Both on the receiving and emitting side an ordinary modem or an ISDN card might be applied, but Ethernet card could as an alternative be applied on the receiving side. The control part of (9) interacts with two APIs, namely the video API and an API capable of initiating phone calls, e.g. Parlay or TAPI and a corresponding createCall method. The control part of (9) may be arranged to initiate a phone call with, for example, a pre-recorded message to an alarm operator or to a person in charge of the environment that is being looked after.

Other alternatives, with regard to the network (11), for transmission of an event notification or other event related media are:

PSTN. In this case the control part of (9) is capable of initiating a PSTN call, e.g. by utilising a TAPI interface with a corresponding TAPI implementation. The TAPI implementation communicates with a modem driver connected to the corresponding modem. The modem is connected to the PSTN. The receiver is an operator with a PSTN enabled phone.

ISDN. In this case the control part of (9) is capable of initiating an ISDN call, e.g. by utilising a TAPI interface with a corresponding TAPI implementation. The TAPI implementation communicates with an ISDN driver connected to the ISDN card. The ISDN card is connected to ISDN. The receiver is an operator with an ISDN enabled phone.

Mobile phone, e.g. GSM. The control part of (9) is capable of initiating a mobile phone based call, i.e. it accesses software and hardware able to initiate a mobile phone call towards a base station. The receiver is an operator handling the phone call.

SMS. The control part of (9) is capable of initiating an SMS message, i.e. it accesses software and hardware able to initiate an SMS message towards a base station. The receiver is an operator with a SMS enabled phone.

Internet based. Mechanisms as e.g. sockets (TCP/IP or UDP/IP), HTTP (comprising e.g. CGI and servlets), Corba, RMI can be applied. Examples are:

Email. The control part of (9) is able to capable of initiating an email. Email utilises UDP sockets running over IP. The receiver must have access to a corresponding email browser.

H.323. The control part of (9) is based on H.323 SW and is responsible for initiating a H.323 call. The receiver must have similar H.323 equipment. H.323 equipment comprise both SW and HW.

SIP. The control part of (9) is based on SIP SW and is responsible for initiating a SIP call. The receiver must have similar SIP equipment. SIP equipment comprise both SW and HW.

A management system enabled for issuing alarms, notifications and or events towards a receiver capable of receiving such events. Such systems might e.g. be based on any of the internet mechanisms outlined above (sockets, HTTP etc.).

Note that the Internet based mechanisms might utilise PLMN, PSTN and or ISDN as bearer. As an example, GSM can be combined with a modem and a PC or laptop enabled for the Internet based mechanisms outlined above. GSM can, as another example, also be combined with WAP and corresponding Internet based mechanisms. Note that bridging mechanisms can be included to allow combined use of the media transport means mentioned above, and that bridges between GSM, PSTN and ISDN are commonly available. Also, bridges of H.323 towards PSTN and ISDN have become commonly available.

Advantages

The application of H.323/SIP based equipment allows more widely standardised equipment at typically lower costs to be applied for surveillance, supervision and alarming purposes.

Communication bearer between the sensor and the server is based on IP packet network giving a lower usage cost, in contrast to expensive circuit switched lines such as e.g. PSTN or ISDN.

The often expensive and rather complex sensor control logic often is comprised on the client, i.e. the sensor side, instead of the server side.

The sensor control logic easily might be modified or updated due to that it resides on the server side in SW.

Allows surveillance, supervision and alarming services to be combined with a variety of GK-services, such as e.g. multiterminal as described above.

Sensors may be stationary or mobile, though stationary would be the normal case. A sensor can be a PDA (Personal Digital Assistant). When being mobile, the sensor could be handheld, i.e. carried by a person, and be used for detecting some type of irregularity such as e.g. in a situation where a guard is guarding a building.

TERMS AND ABBREVIATIONS

Codec Coder/Decoder
Codec
API Application Programming Interface
CGI Common Gateway Interface
DTMF Dual Tone Multiple Frequency
GK Gatekeeper
GUI Graphical User Interface
HHTP Hyper Text Transport Protocol
IP Internet Protocol
ISDN Integrated Services Digital Network
PDA Personal Digital Assistent
PLMN Public Land Mobile Network
PSTN Public Switched Telephone Network
PNP Private Numbering Plan
RMI Remote Method Invocation
SIP Session Initiation Protocol
SMS Short Message Service
TAPI Telephone Application Programming Interface
TCP Transmission Control Protocol
UDP User Datagram Protocol
VPN Virtual Private Network
WAP Wireless Application Protocol

What is claimed is:

1. A multimedia surveillance arrangement comprising:
a multimedia surveillance sensor arrangement comprising an H.323 or SIP adapted first end-point and adapted for establishing a multimedia connection for communicating surveillance media according to a multimedia communication protocol standard corresponding to the H.323 standard recommendation or the SIP standard recommendation, and connected to a first multimedia H.323 or SIP adapted network, said surveillance media representing at least one sensed parameter;

a surveillance receiver comprising an H.323 or SIP adapted second end-point and adapted to receiving all or part of said surveillance media and connected to a second multimedia adapted network; and a network arrangement comprising said first and second multimedia adapted networks and interconnected by media gateways and at least one network controller;

wherein said network controller is a SIP server or an H.323 Gatekeeper and adapted to serve as an endpoint for receiving said surveillance media communicated from said surveillance sensor, said network controller further adapted to interact with said received surveillance media, said network controller responsive to information contained in said received surveillance media and adapted to communicate an event message or at least part of said received surveillance media to said multimedia surveillance receiver on basis of said information.

2. The arrangement of claim 1, wherein said surveillance sensor includes a camera.

3. The arrangement of claim 1, wherein said surveillance sensor includes a microphone.

4. The arrangement of claim 1, wherein said information comprises one of a video signal and an audio signal.

5. The arrangement of claim 1, wherein said network controller is responsive to a change in said information.

6. The arrangement of claim 5, wherein said change is a change of one of (1) a pixel or a group of pixels of said video signal and (2) a sample or a group of samples in said audio signal.

7. The arrangement of claim 1, wherein said surveillance receiver is one of a multimedia terminal, a mobile terminal, and a mobile telephone.

8. A multimedia network controller, said controller being a SIP server or H.323 Gatekeeper for use in a multimedia surveillance arrangement, said arrangement including a network according to a H.323 standard recommendation or a SIP standard recommendation, at least one first multimedia terminal in communication with said network and having an associated surveillance sensor, and at least one second terminal in communication with said network for receiving an event message generated by the multimedia network controller, wherein said controller is adapted to serve as an endpoint for receiving surveillance media from said at least one first multimedia terminal and to serve as an endpoint for transmitting a surveillance event message to said at least one second terminal and said controller including a surveillance media processing means responsive to, and interacting with, said surveillance media for generating said event message on basis of at least one event information item contained in said surveillance media.

9. The multimedia network controller of claim 8, herein said surveillance media processing means is adapted to forwarding to said at least one second terminal said surveillance media received from said at least one first multimedia terminal.

10. The multimedia network controller of claim 8, wherein said surveillance media processing means is adapted to arranging a multimedia connection between said at least one first multimedia terminal and said at least one second terminal for transporting surveillance media therebetween.

* * * * *